United States Patent

Fujita et al.

[11] Patent Number: 5,919,404
[45] Date of Patent: Jul. 6, 1999

[54] REVERSIBLE THERMOCHROMIC COMPOSITIONS

[75] Inventors: Katsuyuki Fujita, Bisai; Yoshiaki Ono, Gifu, both of Japan

[73] Assignee: The Pilot Ink Co., Ltd., Japan

[21] Appl. No.: 09/062,398

[22] Filed: Apr. 20, 1998

[30] Foreign Application Priority Data

Apr. 23, 1997 [JP] Japan .................................. 9-121620
Oct. 30, 1997 [JP] Japan .................................. 9-316294
Dec. 26, 1997 [JP] Japan .................................. 9-368668

[51] Int. Cl.$^6$ .............................. G02F 1/00; C09D 11/00
[52] U.S. Cl. ..................... 252/583; 252/962; 106/31.23
[58] Field of Search ..................... 252/583, 962; 106/31.23

[56] References Cited

U.S. PATENT DOCUMENTS

| | | | |
|---|---|---|---|
| 3,451,338 | 6/1969 | Baum | 252/962 |
| 4,028,118 | 6/1977 | Nakasuji et al. | 252/583 |
| 4,421,560 | 12/1983 | Kito et al. | 252/583 |
| 4,682,194 | 7/1987 | Usami et al. | . |
| 4,720,301 | 1/1988 | Kito et al. | 106/21 A |
| 4,732,810 | 3/1988 | Kito et al. | 252/962 |
| 5,490,956 | 2/1996 | Kito et al. | 252/583 |
| 5,558,700 | 9/1996 | Shibahashi | 252/583 |

FOREIGN PATENT DOCUMENTS 60-264285 12/1985 Japan .
2 184 250 6/1987 United Kingdom .

*Primary Examiner*—Philip Tucker
*Attorney, Agent, or Firm*—Fitzpatrick, Cella, Harper & Scinto

[57] ABSTRACT

A reversible thermochromic composition comprising as essential components (a) an electron-donating color-developing organic compound, (b) at least one electron-accepting compound selected from alkoxyphenol compounds represented by Formula I:

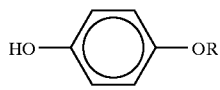

(I)

wherein R represents an alkyl group; and (c) a compound serving as a reaction medium capable of reversibly causing electron-donating/accepting reaction attributable to the components (a) and (b). This composition has a reversible metachromatic function that it presents a color-developed state when heated in a color-extinguished state and presents the color-extinguished state when temperature-dropped or cooled in the color-developed state, or that it begins to develop a color in the course of temperature drop after heating, having been triggered by its temperature rise when heated in a color-extinguished state, and returns to the color-extinguished state after it has presented a color-developed state in a maximum developed-color density.

8 Claims, 4 Drawing Sheets

REVERSIBLE THERMOCHROMIC COMPOSITIONS

This application claims the benefit of Japanese Application, Nos. 9-121620, 9-368668 and 9-316294 which are hereby incorporated by reference.

BACKGROUND OF THE INVENTION

1. Field of the Invention

This invention relates to a reversible thermochromic composition. More particularly, it relates to a reversible thermochromic composition capable of reversibly causing a color-developed state and a color-extinguished state depending on temperature changes. Still more particularly, it relates to a reversible thermochromic composition having a reversible metachromatic function that it presents a color-developed state when heated in a color-extinguished state and presents the color-extinguished state when temperature-dropped or cooled in the color-developed state, or having a reversible metachromatic function that it begins to develop a color in the course of temperature drop after heating, having been triggered by its temperature rise when heated in a color-extinguished state, and returns to the color-extinguished state after it has presented a color-developed state in a maximum developed-color density.

2. Description of the Related Art

With regard to reversible thermochromic compositions capable of causing reversible metachromatism in a specific temperature range upon electron-donating/accepting reaction, some proposals are disclosed in, e.g., U.S. Pat. Nos. 4,028,118, No. 4,720,301 and No. 4,732,810.

The proposals concerning conventional reversible thermochromic compositions are chiefly made on those having the function to exhibit reversible thermochromic properties such that they begin to become color-extinguished in the course of temperature rise caused in a color-developed state, present a completely color-extinguished state at a specific temperature or above, begin to develop a color in the course of subsequent temperature drop and return to the color-developed state (see FIG. 4), which are applied in temperature indicators, toys and so forth.

Meanwhile, an attempt to cause a color-developed state when heated in a color-extinguished state is disclosed in U.S. Pat. No. 4,421,560. This proposes a composition that utilizes temperature dependence of acid dissociation properties of an acidic phosphate compound, which, although exhibits a metachromatic behavior that presents the color-developed state when heated in a color-extinguished state, has an insufficient developed-color density. Also, such a metachromatic composition containing the acidic phosphate compound can be encapsulated in the form of microcapsules with difficulty, and moreover may hardly satisfy durability.

Some proposals on a high-temperature color-developing type are also disclosed in relation to reversible heat-sensitive recording materials in the field of heat-sensitive recording materials. Such reversible heat-sensitive recording materials are so made up that a color-developed state can be exhibited by applying a heat while keeping a thermal head of a thermal printer at a temperature exceeding hundred and tens of degrees. Hence, no effective metachromatic behavior can be presented within the life-environment temperature range, and there is a restriction on their application in the fields of temperature indicators, toys and so forth.

SUMMARY OF THE INVENTION

The present inventors made further studies on such reversible thermochromic compositions. As a result, they have discovered that a specific alkoxyphenol compound may be used as an electron accepting compound in a reversible thermochromic composition, whereby the reversible thermochromic composition can exhibit a metachromatic behavior that it presents a color-developed state in a high density when heated in a color-extinguished state within the life-environment temperature range and returns to the color-extinguished state upon temperature drop, or can exhibit a metachromatic behavior that it presents a color-developed state in a maximum developed-color density in the course of temperature drop after heating, having been triggered by its temperature rise when heated in a color-extinguished state, and thereafter returns to the color-extinguished state, and hence such a composition can bring about a new metachromatic effect in various temperature indicators as a matter of course, as well as in the fields of toys, decoration, designing and so forth. Thus, they have accomplished the present invention.

The present invention provides a reversible thermochromic composition comprising as essential components;

(a) an electron-donating color-developing organic compound;

(b) at least one electron-accepting compound selected from alkoxyphenol compounds represented by Formula I:

(I)

wherein R represents an alkyl group; and (c) a compound serving as a reaction medium capable of reversibly causing electron-donating/accepting reaction attributable to the components (a) and (b).

In the reversible thermochromic composition of the present invention, the alkyl group of the alkoxyphenol compound represented by Formula I may be a straight-chain or branched alkyl group having 3 to 18 carbon atoms. The component (c) may contain at least one compound selected from a chain hydrocarbon, an alicyclic hydrocarbon, an aromatic hydrocarbon and a halogenated hydrocarbon, and the reversible thermochromic composition may be encapsulated in the form of microcapsules.

The reversible thermochromic composition of the present invention can be a reversible thermochromic composition having a reversible metachromatic function that it presents a color-developed state when heated in a color-extinguished state and presents the color-extinguished state when temperature-dropped or cooled in the color-developed state. Such a composition may be heated at a temperature not higher than 90° C.

The reversible thermochromic composition of the present invention can also be a reversible thermochromic composition having a reversible metachromatic function that it begins to develop a color in the course of temperature drop after heating, having been triggered by its temperature rise when heated in a color-extinguished state, and returns to the color-extinguished state after it has presented a color-developed state in a maximum developed-color density. Such a composition may be heated at a temperature not lower than the melting point of the component-(c) compound.

DESCRIPTION OF THE PREFERRED EMBODIMENTS

Figure 1:
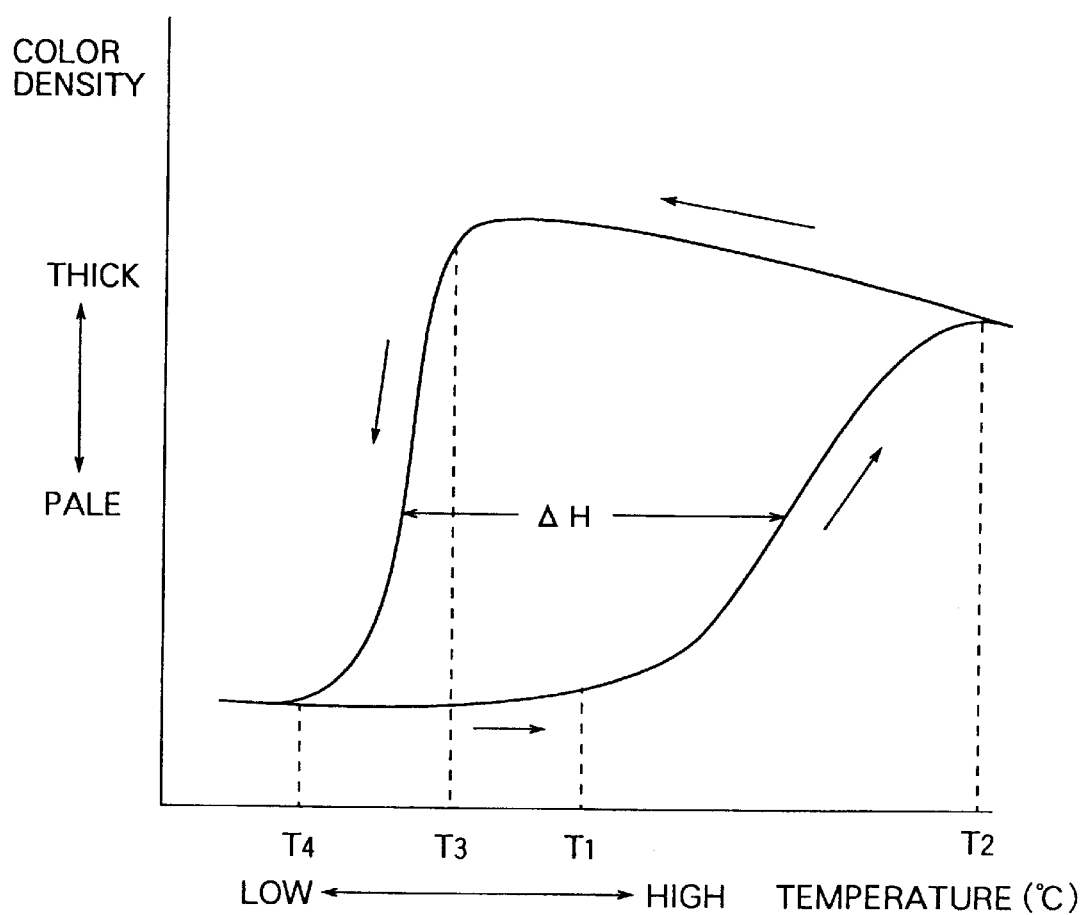
FIG. 1 is a graph showing temperature-color density curves of a reversible thermochromic composition according to the present invention which presents a color-developed state when heated in a color-extinguished state.

The reversible thermochromic composition of the present invention has as essential components the following components (a) to (c).

Component (a): an electron-donating color-developing organic compound;

Component (b): at least one electron-accepting compound selected from alkoxyphenol compounds represented by Formula I:

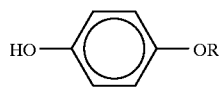

(I)

wherein R represents an alkyl group; and

Component (c): a compound serving as a reaction medium capable of reversibly causing electron-donating/accepting reaction.

The component-(a) electron-donating color-developing organic compound may include conventionally known diphenylmethanephthalides, phenylindolylphthalides, indolylphthalides, diphenylmethaneazaphthalides, phenylindolylazaphthalides, fluorans, styrylquinolines and diazarhodamine lactones; which are exemplified by the following compounds.

3,3-Bis(p-dimethylaminophenyl)-6-dimethylaminophthalide, 3-(4-diethylaminophenyl)-3-(1-ethyl-2-methylindol-3-yl)phthalide, 3-3-bis(1-n-butyl-2-methylindol-3-yl)phthalide, 3,3-bis(2-ethoxy-4-diethylaminophenyl)-4-azaphthalide, 3-[2-ethoxy-4-(N-ethylanilino)phenyl]-3-(1-ethyl-2-methylindol-3-yl)-4-azaphthalide, 3,6-dimethoxyfluoran, 3,6-di-n-butoxyfluoran, 2-methyl-6-(N-ethyl-N-p-tolylamino)fluoran, 3-chloro-6-cyclohexylaminofluoran, 2-methyl-6-cyclohexylaminofluoran, 2-(2-chloroanilino)-6-di-n-butylaminofluoran, 2-(3-trifluoromethylanilino)-6-diethylaminofluoran, 2-(N-methylanilino)-6-(N-ethyl-N-p-tolylamino)fluoran, 1,3-dimethyl-6-diethylaminofluoran, 2-chloro-3-methyl-6-diethylaminofluoran, 2-anilino-3-methyl-6-diethylaminofluoran, 2-anilino-3-methyl-6-di-n-butylaminofluoran, 2-xylidino-3-methyl-6-diethylaminofluoran, 1,2-benz-6-diethylaminofluoran, 1,2-benz-6-(N-ethyl-N-isobutylamino)fluoran, 1,2-benz-6-(N-ethyl-N-isoamylamino)fluoran, 2-(3-methoxy-4-dodecoxystyryl)quinoline, spiro[5H-(1)benzopyrano(2,3-d)pyrimidine-5,1'(3'H)isobenzofuran]-3'-one,2-(diethylamino)-8-(diethylamino)-4-methyl-, spiro[5H-(1)benzopyrano(2,3-d)pyrimidine-5,1'(3'H)isobenzofuran]-3'-one,2-(di-n-buthylamino)-8-(di-n-buthylamino)-4-methyl-, spiro[5H-(1)benzopyrano(2,3-d)pyrimidine-5,1'(3'H) isobenzofuran]-3'-one,2-(di-n-buthylamino)-8-(diethylamino)-4-methyl-, spiro[5H-(1)benzopyrano(2,3-d) pyrimidine-5,1'(3'H)isobenzofuran]-3'-one,2-(di-n-buthylamino)-8-(N-ethyl-N-i-amylamino)-4-methyl-, spiro [5H-(1)benzopyrano(2,3-d)pyrimidine-5,1'(3'H) isobenzofuran]-3'-one,2-(di-n-buthylamino)-8-(di-n-buthylamino)-4-phenyl, etc.

Pyridine compounds, quinazoline compounds and bis-quinazoline compounds may also be used, which are effective for presenting fluorescent yellow to red color formation.

In the present invention, in the composition comprised of the component-(a) electron-donating color-developing organic compound, the component-(b) electron-accepting compound and the component-(c) reaction medium for the both, a specific compound is used as the component (b), whereby a reversible thermochromic composition can be obtained which presents a color-developed state in the course of heating in a color-extinguished state approximately within the life-environment temperature range and presents the color-extinguished state in the course of temperature drop caused in the color-developed state.

The component-(b) electron accepting compound is selected from the alkoxyphenol compounds represented by Formula I. The alkyl group of this compound may preferably be an alkyl group having 3 to 18 carbon atoms. This is because a system having an alkyl group less than 3 or more than 18 may have too low a developed-color density to satisfy practical utility. The alkyl group may be either straight-chain or branched. Taking account of metachromatic performance, developed-color density and higher practical performance, a straight-chain alkyl group is preferred, which may preferably be selected from straight-chain alkyl groups having 6 to 12 carbon atoms, and more preferably straight-chain alkyl groups having 8 to 12 carbon atoms.

The alkoxyphenol compounds are exemplified by the following.

p-n-Propyloxyphenol, p-n-butyloxyphenol, p-n-pentyloxyphenol, p-n-hexyloxyphenol, p-n-heptyloxyphenol, p-n-octyloxyphenol, p-n-nonyloxyphenol, p-n-decyloxyphenol, p-n-undecyloxyphenol, p-n-dodecyloxyphenol, p-n-tridecyloxyphenol, p-n-tetradecyloxyphenol, p-n-pentyldecyloxyphenol, p-n-hexyldecyloxyphenol, p-n-heptyldecyloxyphenol, p-n-octyldecyloxyphenol, p-n-isorpropyloxyphenol, p-1-methylpropyloxyphenol, p-3-methylbutyloxyphenol, p-2-methylpentyloxyphenol, p-1-ethylpentyloxyphenol, p-1-ethylhexyloxyphenol, p-3,5,5-trimethylhexyloxyphenol, p-3,7-dimethyloctyloxyphenol, p-1-ethylpropyloxyphenol, p-2-methylhexyloxyphenol, p-1-methylheptyloxyphenol, p-1-methyloctyloxyphenol, etc.

Even a composition comprised of the two components (a) and (b) used in the reversible thermochromic composition of the present invention can have a reversible heat color-developability, but there is a limit to the adjustment of metachromatic temperature. The use of the component (c) enables the adjustment of metachromatic temperature in practical use. The more carbon atoms the straight-chain alkyl group of the alkoxyphenol compound represented by Formula I has, the smaller temperature difference between melting point and cloud point and the higher crystallizability tend to be. Thus, in the reversible thermochromic composition of the present invention, the addition of the component (c) makes it possible to use a more highly crystallizable alkoxyphenol compound at a metachromatic temperature within a lower temperature range. The selection of a suitable component (c) as described above also makes it possible to attain hysteresis characteristics showing a great difference between the course taken from the color-extinguished state to the color-developed state and the course taken from the color-developed state to the color-extinguished state, in the curves formed by plotting changes in color density caused by changes in temperature.

The compound effective as the component-(c) reaction medium which reversibly causes electron-donating/accepting reaction attributable to the components (a) and (b) within a specific temperature range may include reaction mediums conventionally put into general use, such as hydrocarbons, halogenated hydrocarbons, sulfides, ethers, ketones, esters, acid amides, alcohols and waxes, all of which are effective. Any of these compounds may be semi-liquid substance as exemplified by medium-molecular-weight polymers, and may be used alone or in combination of two or more. When these compounds are applied in micro-encapsulation and fabrication, compounds having 10 or more carbon atoms are effective in order to be stably held in capsules, because those having a low-molecular-weight may evaporate out of the capsule system when treated at a high temperature.

The hydrocarbons may include saturated or unsaturated chain hydrocarbons, alicyclic hydrocarbons, aromatic hydrocarbons and halogenated hydrocarbons. The saturated chain hydrocarbons may be exemplified by pentadecane, hexadecane, heptadecane, octadecane, nonadecane, eicosane, heneicosane, docosane, tricosane, tetracosane, pentacosane, hexacosane, heptacosane, octacosane, nonacosane and triacontane.

The unsaturated chain hydrocarbons may be exemplified by 1-pentadecene, 1-hexadecene, 1-heptadecene, 1-octadecene, 1-nonadecene, 1-eicosene, 1-heneicosene, 1-docosene, 1-tricosene, 1-tetracosene, 1-pentacosene, 1-hexacosene, 1-heptacosene, 1-octacosene, 1-nonacosane and 1-triacontene.

The alicyclic hydrocarbons may be exemplified by cyclooctane, cyclododecane, n-pentadecylcyclohexane, n-octadecylcyclohexane, n-nonadecylcyclohexane and decahydronaphthalene.

The aromatic hydrocarbons may be exemplified by dodecylbenzene, biphenyl, ethyl biphenyl, 4-benzylbenzene, phenyl tolyl methane, diphenyl ethane, 1,3-diphenylbenzene, dibenzyl toluene, methyl naphthalene, 2,7-diisopropyl naphthalene, methyl tetralin and naphthyl phenyl methane.

The halogenated hydrocarbons may be exemplified by 1-bromodecane, 1-bromoundecane, 1-bromododecane, 1-bromotridecane, 1-bromotetradecane, 1-chlorotetradecane, 1-bromopentadecane, 1-bromohexadecane, 1-chlorohexadecane, 1-iodohexadecane, 1-bromoheptadecane, 1-bromooctadecane, 1-chlorooctadecane, 1-iodooctadecane, 1-bromoeicosane, 1-chloroeicosane, 1-bromodocosane and 1-chlorodocosane.

The compound selected from the above chain hydrocarbons, alicyclic hydrocarbons, aromatic hydrocarbons and halogenated hydrocarbons have small desensitization properties to the color formation attributable to the components (a) and (b), present a color-developed state when heated in a color-extinguished state, and can effectively function when used in the reversible thermochromic composition having the reversible metachromatic function to present a color-extinguished state upon temperature drop caused in the color-developed state.

The sulfides may be exemplified by di-n-octyl sulfide, di-n-nonyl sulfide, di-n-decyl sulfide, di-n-dodecyl sulfide, di-n-tetradecyl sulfide, di-n-hexadecyl sulfide, di-n-octadecyl sulfide, octydodecyl sulfide, diphenyl sulfide, dibenzyl sulfide, ditolyl sulfide, diethyl phenyl sulfide, dinaphthyl sulfide, 4,4'-dichloro-diphenyl sulfide and 2,4,5, 4'-tetrachloro-diphenyl sulfide.

The ethers may include aliphatic ethers having 10 or more carbon atoms in total, as exemplified by dipentyl ether, dihexyl ether, diheptyl ether, dioctyl ether, dinonyl ether, didecyl ether, diundecyl ether, didodecyl ether, ditridecyl ether, ditetradecyl ether, dipentadecyl ether, dihexadecyl ether, dioctadecyl ether, decanediol dimethyl ether, undecanediol dimethyl ether, dodecanediol dimethyl ether, tridecanediol dimethyl ether, decanediol diethyl ether and undecanediol diethyl ether. They may also include alicyclic ethers such as s-trioxane. They may still also include aromatic ethers such as s-trioxane, and aromatic ethers such as phenyl ether, benzyl phenyl ether, dibenzyl ether, di-p-tolyl ether, 1-methoxynaphthalene and 3,4,5-trimethoxytoluene.

The ketons may include aliphatic ketones having 10 or more carbon atoms in total, as exemplified by 2-decanone, 3-decanone, 4-decanone, 2-undecanone, 3-undecanone, 4-undecanone, 5-undecanone, 2-dodecanone, 3-dodecanone, 4-dodecanone, 5-dodecanone, 2-tridecanone, 3-tridecanone, 2-tetradecanone, 2-pentadecanone, 8-pentadecanone, 2-hexadecanone, 3-hexadecanone, 9-heptadecanone, 2-pentadecanone, 2-octadecanone, 2-nonadecanone, 10-nonadecanone, 2-eicosanone, 11-eicosanone, 2-heneicosanone, 2-docosanone, laurone and stearone.

The ketones may also include aryl alkyl ketones having 12 to 24 carbon atoms in total, as exemplified by n-octadecanophenone, n-heptadecanophenone, n-hexadecanophenone, n-pentadecanophenone, n-tetradecanophenone, 4-n-dodecanoacetophenone, n-tridecaphenone, 4-n-undecanoacetophenone, n-laurophenone, 4-n-decanoacetophenone, n-undecanophenone, 4-n-nonylacetophenone, n-decanophenone, 4-n-octylacetophenone, n-nonaphenone, 4-n-heptylacetophenone, n-octanophenone, 4-n-hexylacetophenone, 4-n-cyclohexylacetophenone, 4-tert-butylpropiophenone, n-heptaphenone, 4-n-pentylacetophenone, cyclohexyl phenyl ketone, benzyl n-butyl ketone, 4-n-butylacetophenone, n-hexaphenone, 4-isobutylacetophenone, 1-acetonaphthone, 2-acetonaphthone and cyclopentyl phenyl ketone.

They may still also include aryl ketones as exemplified by benzophenone, benzyl phenyl ketone and dibenzyl ketone; alicylic ketones as exemplified by cyclooctanone, cyclododecanone, cyclopentadecanone and 4-tert-butylcyclohexanone.

As the esters, esters having 10 or more carbon atoms are effective, including esters obtained from any desired combination of monobasic carboxylic acids having an aliphatic, alicyclic or aromatic ring with monohydric alcohols having an aliphatic, alicyclic or aromatic ring; esters obtained from any desired combination of polybasic carboxylic acids having an aliphatic, alicyclic or aromatic ring with monohydric alcohols having an aliphatic, alicyclic or aromatic ring; and esters obtained from any desired combination of monobasic carboxylic acids having an aliphatic, alicyclic or aromatic ring with polyhydric alcohols having an aliphatic, alicyclic or aromatic ring. They may specifically include ethyl caprylate, octyl caprylate, stearyl caprylate, myristyl caprate, stearyl caprate, docosyl caprate, 2-ethylhexyl laurate, n-decyl laurate, 3-methylbutyl myristate, cetyl myristate, isopropyl palmitate, neopentyl palmitate, nonyl palmitate, cyclohexyl palmitate, n-butyl stearate, n-methylbutyl stearate, 3,5,5-trimethylhexyl stearate, n-undecyl stearate, pentadecyl stearate, stearyl stearate, cyclohexylmethyl stearate, isopropyl behenate, hexyl behenate, lauryl behenate, behenyl behenate, cetyl benzoate, stearyl p-tert-butyl benzoate, dimyristyl phthalate, distearyl phthalate, dimyristyl oxalate, dicetyl oxalate, dicetyl malonate, dilauryl succinate, dilauryl glutarate, diundecyl adipate, dilauryl azelate, di-(n-nonyl) sebacate, dineopentyl 1,18-octadecylmethylenedicarboxylate, ethylene glycol dimyristate, propylene glycol dillaurate, propylene glycol distearate, hexylene glycol dipalmitate, 1,5-pentanediol dimyristate, 1,2,6-hexanetriol trimyristate, 1,4-cyclohexanediol didecyl, 1,4-cyclohexanedimethanol dimyristate, xylene glycol dicaprinate and xylene glycol distearate.

Ester compounds selected from the following are also effective, which are esters of saturated fatty acids with branched aliphatic alcohols, and esters of unsaturated fatty acids or saturated fatty acids having a branch or substituent with aliphatic alcohols branched or having 16 or more carbon atoms. They may specifically be exemplified by 2-ethylhexyl butyrate, 2-methylbutyl behenate, 2-ethylhexyl myristate, 2-ethylhexyl caprate, 3,5,5-trimethylhexyl laurate, 3,5,5-trimethylhexyl palmitate, 3,5,5-trimethylhexyl stearate, 2-methylbutyl caproate, 2-methylbutyl caprylate, 2-methylbutyl caprate, 1-ethylpropyl palmitate, 1-ethylpropyl stearate, 1-ethylpropyl behenate, 1-ethylhexyl laurate, 1-ethylhexyl myristate, 1-ethylhexyl palmitate, 2-methylpentyl caproate, 2-methylpentyl caprylate, 2-methylpentyl caprate, 2-methylpentyl laurate, 2-methylbutyl stearate, 3-methylbutyl stearate, 1-methylheptyl stearate, 2-methylbutyl behenate, 3-methylbutyl behenate, 1-methylheptyl stearate, 1-methylheptyl behenate, 1-ethylpentyl caproate, 1-ethylpentyl palmitate, 1-methylpropyl stearate, 1-methyloctyl stearate, 1-methylhexyl stearate, 1,1-dimethylpropyl laurate, 1-methylpentyl caprate, 2-methylhexyl palmitate, 2-methylhexyl stearate, 2-methylhexyl behenate, 3,7-dimethyloctyl laurate, 3,7-dimethyloctyl myristate, 3,7-dimethyloctyl palmitate, 3,7-dimethyloctyl stearate, 3,7-dimethyloctyl behenate, stearyl oleate, behenyl oleate, stearyl linolate, behenyl linolate, 3,7-dimethyloctyl erucate, stearyl erucate, isostearyl erucate, cetyl isostearate, stearyl isostearate, 2-methylpentyl 12-hydroxystearate, 2-ethylhexyl 18-bromostearate, isostearyl 2-ketomyristate, 2-ethylhexyl 2-fluoromyristate, cetyl butyrate, stearyl butyrate and behenyl butyrate.

The esters may also include carboxylate compounds as disclosed in Japanese Patent Publication No. 4-17154, e.g., carboxylates containing a substituted aromatic group in the molecule, esters of carboxylic acids containing an unsubstituted aromatic group with aliphatic alcohols having 10 or more carbon atoms, carboxylates containing a cycloalkyl group in the molecule, esters of fatty acids having 6 or more carbon atoms with unsubstituted aromatic alcohols or phenols, esters of fatty acids having 8 or more carbon atoms with branched aliphatic alcohols, and esters of carboxylic acids with aromatic alcohols or branched aliphatic alcohols, as well as dibenzyl cinnamate, heptyl stearate, didecyl adipate, dilauryl adipate, dimyristyl adipate, dicetyl adipate, distearyl adipate, trilaurin, trimyristin, tristearin, dimyristin and distearin.

Fatty acid ester compounds obtained from aliphatic monohydric alcohols having 9 or more odd-numbered carbon atoms and aliphatic carboxylic acids having even-numbered carbon atoms, and fatty acid ester compounds having 17 to 23 carbon atoms in total, obtained from n-pentyl alcohol or n-heptyl alcohol and aliphatic carboxylic acids having 10 to 16 even-numbered carbon atoms are also effective.

They may specifically include n-pentadecyl acetate, n-tridecyl butyrate, n-pentadecyl butyrate, n-undecyl caproate, n-tridecyl caproate, n-pentadecyl caproate, n-nonyl caprylate, n-undecyl caprylate, n-tridecyl caprylate, n-pentadecyl caprylate, n-heptyl caprate, n-nonyl caprate, n-undecyl caprate, n-tridecyl caprate, n-pentadecyl caprate, n-pentyl laurate, n-heptyl laurate, n-nonyl laurate, n-undecyl laurate, n-tridecyl laurate, n-pentadecyl laurate, n-pentyl myristate, n-heptyl myristate, n-nonyl myristate, n-undecyl myristate, n-tridecyl myristate, n-pentadecyl myristate, n-pentyl palmitate, n-heptyl palmitate, n-nonyl palmitate, n-undecyl palmitate, n-tridecyl palmitate, n-pentadecyl palmitate, n-nonyl stearate, n-undecyl stearate, n-tridecyl stearate, n-pentadecyl stearate, n-nonyl eicosanate, n-undecyl eicosanate, n-tridecyl eicosanate, n-pentadecyl eicosanate, n-nonyl behenate, n-undecyl behenate, n-tridecyl behenate and n-pentadecyl behenate.

The alcohols may include aliphatic monohydric saturated alcohols as exemplified by decyl alcohol, undecyl alcohol, dodecyl alcohol, tridecyl alcohol, tetradecyl alcohol pentadecyl alcohol, hexadecyl alcohol, heptadecyl alcohol, octadecyl alcohol eicosyl alcohol and docosyl alcohol; aliphatic unsaturated alcohols as exemplified by allyl alcohol and oleyl alcohol; alicyclic alcohols as exemplified by cyclopentanol, cyclohexananol, cyclooctananol, cyclododecananol, 4-tert-butylcylcohexanol; aromatic alcohols as exemplified by 4-methylbenzyl alcohol and benzhydrol; polyhydric alcohols as exemplified by polyethylene glycol.

The acid amides may be exemplified by the following compounds.

Acetamide, propionic acid amide, butyric acid amide, caproic acid amide, caprylic acid amide, capric acid amide, lauric acid amide, myristic acid amide, palmitic acid amide, stearic acid amide, behenic acid amide, oleic acid amide, erucic acid amide, benzamide, caproic acid anilide, caprylic acid anilide, capric acid anilide, lauric acid anilide, myristic acid anilide, palmitic acid anilide, stearic acid anilide, behenic acid anilide, oleic acid anilide, erucic acid anilide, N-methylcaproic acid amide, N-methylcaprylic acid amide, N-methylcapric acid amide, N-methyllauric acid amide, N-methylmyristic acid amide, N-methylpalmitic acid amide, N-methylstearic acid amide, N-methylbehenic acid amide, N-methyloleic acid amide, N-methylerucic acid amide, N-ethyllauric acid amide, N-ethylmyristic acid amide, N-ethylpalmitic acid amide, N-ethylstearic acid amide, N-ethyloleic acid amide, N-butyllauric acid amide, N-butylmyristic acid amide, N-butylpalmitic acid amide, N-butylstearic acid amide, N-butyloleic acid amide, N-octyllauric acid amide, N-octylmyristic acid amide, N-octylpalmitic acid amide, N-octylstearic acid amide, N-octyloleic acid amide, N-dodecyllauric acid amide, N-dodecylmyristic acid amide, N-dodecylpalmitic acid amide, N-dodecylstearic acid amide, N-dodecyloleic acid amide, dilauric acid amide, dimyristic acid amide, dipalmitic acid amide, distearic acid amide, dioleic acid amide, trilauric acid amide, trimyristic acid amide, tripalmitic acid amide, tristearic acid amide, trioleic acid amide, succinic acid amide, adipic acid amide, glutaric acid amide, malonic acid amide, azelaic acid amide, maleic acid amide, N-methylsuccinic acid amide, N-methyladipic acid amide, N-methylglutaric acid amide, N-methylmalonic acid amide, N-methylazelaic acid amide, N-ethylsuccinic acid amide, N-ethyladipic acid amide, N-ethylglutaric acid amide, N-ethylmalonic acid amide, N-ethylazelaic acid amide, N-butylsuccinic acid amide, N-butyladipic acid amide, N-butylglutaric acid amide, N-butylmalonic acid amide, N-octyladipic acid amide and N-dodecyladipic acid amide.

The waxes and medium-molecular-weight polymers may be exemplified by paraffin wax having a melting point of from 50 to 120° C., microcrystalline wax, petrolatum, paraffin oxide wax and petrolatum oxide; shellac, sugar cane wax, carnauba wax, candelilla wax, castor wax, beef tallow hardened oil, fish oil hardened oil, repeseed hardened oil, montan wax, palm wax, insect wax, haze wax (Japan wax) and wool grease; polyethylene oxide wax, montanic acid wax, ethylene-vinyl acetate copolymer wax, ethylene-acrylate copolymer wax and vinyl ether wax; palm oil, babassu oil, liquid paraffin, polybutene, polybutadiene and polystyrene oligomers.

The reversible thermochromic composition of the present invention has the components (a), (b) and (c) as essential components, and the proportion of these components depends on concentration, metachromatic temperature, metachromatic form and the types of these components. In general, as a component proportion that can achieve the desired characteristics, the component-(b) may be within the range of from 0.1 to 50, and preferably from 0.5 to 20, and the component-(c) from 1 to 200, preferably from 5 to 100, and more preferably from 20 to 50, based on the component-(a) assumed as 1 (these proportions are all by weight).

It is essential for the present invention to use the alkoxyphenol compound represented by Formula I. In such an instance, the present reversible thermochromic composition has properties such that its heating metachromatic behavior depends on the magnitude of desensitization properties of the component-(c), and shows either i) a reversible metachromatic function that it presents a color-developed state when heated in a color-extinguished state and presents the color-extinguished state when temperature-dropped or cooled in the color-developed state or ii) a reversible metachromatic function that it begins to develop a color in the course of temperature drop after heating, having been triggered by its temperature rise when heated in a color-extinguished state, and returns to the color-extinguished state after it has presented a color-developed state in a maximum developed-color density.

These functions will be detailed below. In the system having the reversible metachromatic function that the composition presents a color-developed state when heated in a color-extinguished state and presents the color-extinguished state when temperature-dropped or cooled in the color-developed state, the component-(b) alkoxyphenol compound has properties of a relatively low melting point, a small difference between melting point and cloud point and a good crystallizability, and hence it is presumed that the alkoxyphenol compound comes into a molten state or a dissolved state in the course of heating in a color-extinguished state, and causes a color-developed state by the electron-donating/accepting reaction with the component-(a), and that the alkoxyphenol compound is crystallized in the course of cooling in the color-developed state and becomes parted from the component-(a) to bring about the color-extinguished state. The metachromatic temperature of the reversible thermochromic composition can be set by selecting as the component (b) an alkoxyphenol compound having suitable melting point and cloud point. Also, the metachromatic temperature can be controlled by using two or more alkoxyphenol compounds in combination to lower the melting point.

Thus, the composition has a metachromatic temperature range at temperatures lower than conventional reversible heat-sensitive recording materials, i.e., life-environment temperatures of 90° C. or below, and can cause metachromatism by heat, e.g., by hot water, cold water and the body heat. Moreover, color-developing temperature and color-extinguishing temperature can be controlled with ease, and hence it is possible to attain hysteresis characteristics showing a great difference between the course taken from the color-extinguished state to the color-developed state and the course taken from the color-developed state to the color-extinguished state, in the curves formed by plotting changes in color density caused by changes in temperature.

Metachromatic performance of the reversible thermochromic composition in which the components (a), (b) and (c) have been homogeneously mixed will be described with reference to FIGS. 1 and 2, which are graphs showing temperature-color density curves.

Figure 2:
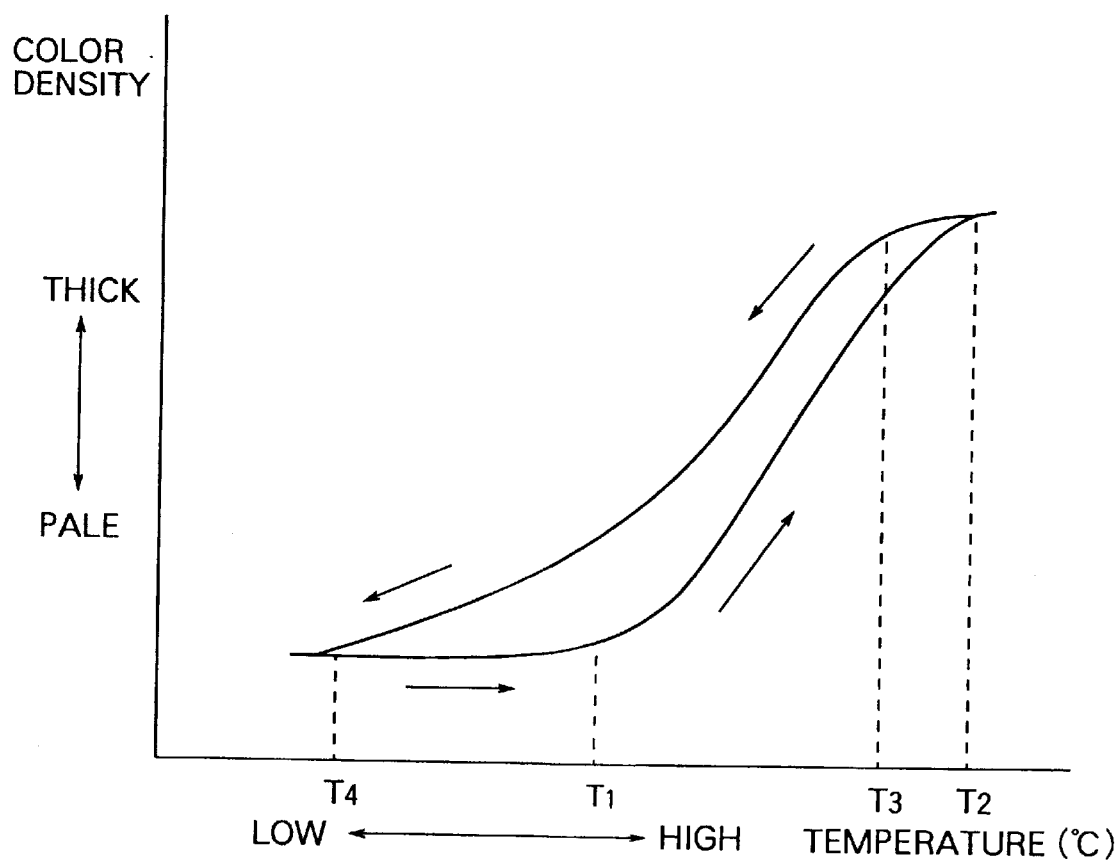
FIG. 2 is a graph showing temperature-color density curves of a reversible thermochromic composition according to the present invention which presents a color-developed state when heated in a color-extinguished state.

In FIGS. 1 and 2, the color density is plotted as ordinate and the temperature as abscissa.

Changes in color density caused by temperature changes progress along arrows.

Here, temperature T1 represents color-developing start temperature; T2, completely color-developed temperature; T3, color-extinguishing start temperature; and T4, completely color-extinguished temperature.

As the temperature difference between the course taken from the color-extinguished state to the color-developed state and the course taken from the color-developed state to the color-extinguished state, hysteresis width ΔH is calculated according to the following expression:

$$\Delta H = (T2-T1)/2 - (T3-T4)/2.$$

Therefore, a composition that forms a color-extinguished state at a temperature of T1 or below begins to develop a color, and comes into a completely color-developed state once it has reached temperature T2. The composition heated (temperature-raised) to a temperature exceeding T2 begins to become color-extinguished once it has reached temperature T3 in the course of temperature drop, and, when further cooled (temperature-dropped), it comes to have a lower color density to become completely color-extinguished once it has reached temperature T4.

Figure 4:
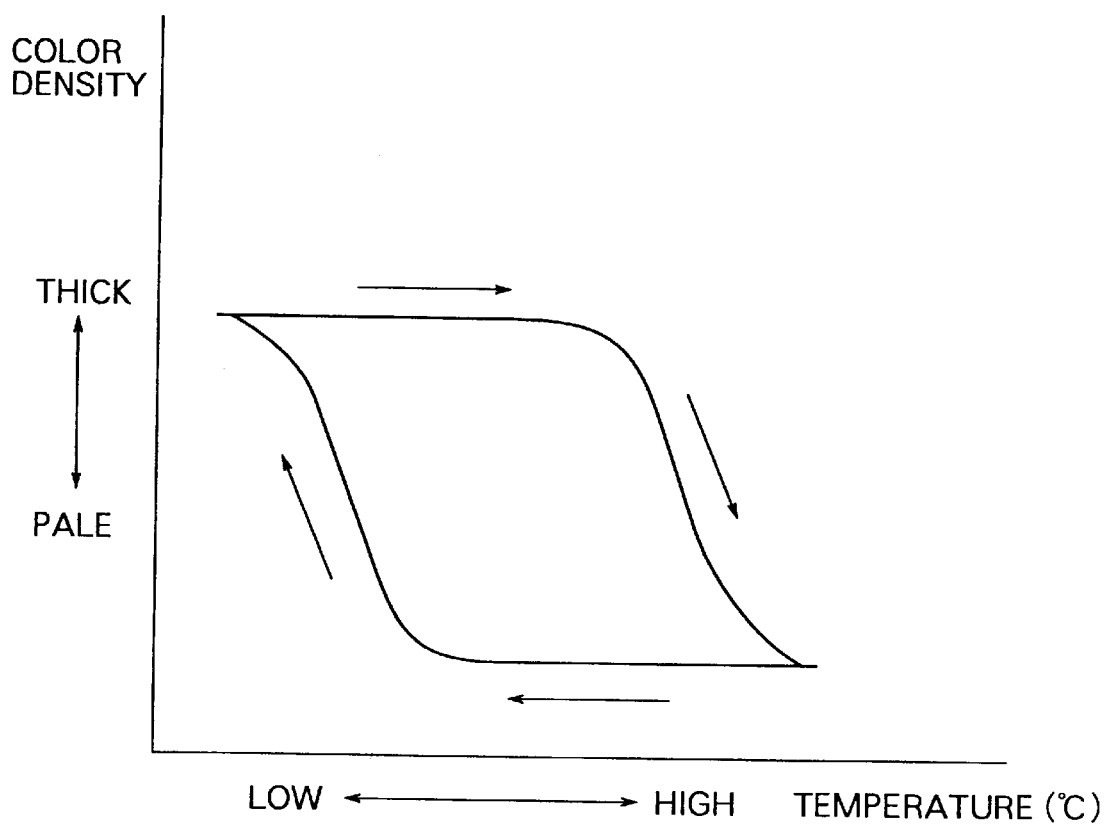
FIG. 4 is a graph showing temperature-color density curves of a conventional reversible thermochromic composition which is color-extinguished with heating.

The composition having been temperature-dropped to a temperature lower than the temperature T4 reversibly again shows the above metachromatic behavior. Thus, the metachromatic behavior is shown as a metachromatic behavior which is contrary to that of a conventional reversible thermochromic composition (FIG. 4).

In the system having the reversible metachromatic function that the composition begins to develop a color in the course of temperature drop after heating, having been triggered by its temperature rise when heated in a color-extinguished state, and returns to the color-extinguished state after it has presented a color-developed state in a maximum developed-color density, it is presumed that a high crystallizability of the component-(b) correlates with the behavior caused by the melting of the component-(c) and influences the electron-donating/accepting reaction between the component-(a) and the component-(b) to present the metachromatic behavior of color-developing and color-extinguishing. To explain this point, in a mutual mixed state of the components (a), (b) and (c), the component-(c) comes into the state of a solution upon heating at a temperature not lower than its melting point, and the component-(b) standing crystallized is again dissolved so that the composition presents a color-extinguished state because the component (a) is present in an independent state. Where the component-(c) begins to gradually solidify in the course of temperature drop caused in that state, the component (a) and the component (b) are ionized to combine so that the composition comes into a color-developed state. With further temperature drop, the component (b) begins to be crystallized, so that the component (a) and the component (b) turn out of combination so that the composition begins to become color-extinguished, and finally presents a colorless, color-extinguished state, as so presumed.

Metachromatic performance of the above reversible thermochromic composition in which the components (a), (b) and (c) have been homogeneously mixed will be described with reference to FIG. 3, which is a graph showing temperature-color density curves.

Figure 3:
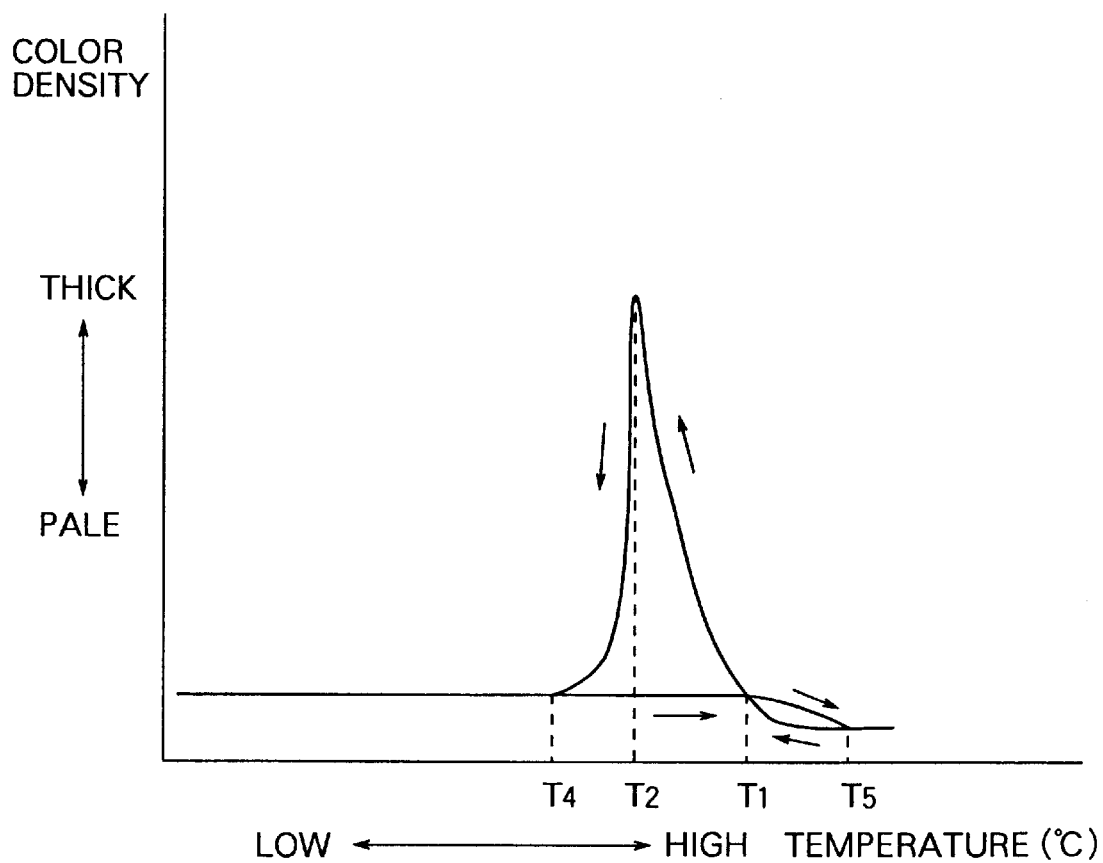
FIG. 3 is a graph showing temperature-color density curves of a reversible thermochromic composition according to the present invention which has a reversible metachromatic function that it begins to develop a color in the course of temperature drop after heating, having been triggered by its temperature rise when heated in a color-extinguished state.

In FIG. 3, the color density is plotted as ordinate and the temperature as abscissa.

Changes in color density caused by temperature changes progress along arrows.

Here, temperature T5 represents temperature at which the reversible thermochromic composition completely melts; temperature T1 represents color-developing start temperature; T2, completely color-developed temperature; and T4, completely color-extinguished temperature.

Therefore, a composition heated (temperature-raised) to a temperature exceeding T5 begins to develop a color once it has reached temperature T1 in the course of its temperature drop, to become higher in color density, and comes into a completely color-developed state once it has reached temperature T2, to present a maximum developed-color density. When further cooled (temperature-dropped), the composition comes to have a lower color density, and becomes completely color-extinguished once it has reached temperature T4.

The composition having been temperature-dropped to a temperature lower than the temperature T4 reversibly again shows the above metachromatic behavior when it is again heated to the temperature exceeding T5.

The present reversible thermochromic composition can be effective even when used as it is, or may preferably be used in the state it has been encapsulated in the form of microcapsules. This is because the composition can of course be kept from a lowering of its function even if it comes into contact with chemically active substances such as acidic substances, basic substances and peroxides or other solvent components, and can keep its heat resistance stable, and also because the reversible thermochromic composition can be compositionally kept constant under various service conditions and can be operative and effective alike.

Such a microcapsular pigment material obtained by encapsulating the reversible thermochromic composition may have a particle diameter of from 0.1 to 100 µm, and preferably from 3 to 30 µm, within the range of which it can satisfy practical utility.

To encapsulate the composition in the form of microcapsules, any conventionally known methods may be used, including interfacial polymerization, in-situ polymerization, coating by hardening in liquid, phase separation from aqueous solution, phase separation from organic solvent, melt-dispersion cooling, coating by suspension in gas, and spray drying, any of which may be appropriately selected according to uses. On the surfaces of the microcapsules, secondary resin films may further be provided according to purpose so as to be endowed with durability or modified in surface properties before the microcapsules are put into practical use.

The components (a), (b) and (c) described above may each be a mixture of two or more compounds for each component, and a light stabilizer may further be added so long as the function is not hindered.

Such a light stabilizer may include compounds capable of restraining oxidation reaction as exemplified by ultraviolet light absorbers, visible light absorbers, infrared light absorbers, antioxidants, singlet oxygen quenchers such as corotenes, coloring matters, amines, phenols, nickel complexes and sulfides, super-oxide anionic quenchers such as complexes of oxide dismutases with cobalt or nickel, and ozone quenchers, which prevent a photo-deterioration that may be caused when the composition is brought into excitation by the photo-reaction of the component (a) and any of which may be mixed in the system in an amount of from 0.3 to 24% by weight, and preferably from 0.8 to 16% by weight. In particular, a system making use of an ultraviolet light absorber and at least one of an antioxidant and a singlet oxygen quencher in combination is especially effective for improving light-fastness.

An anti-aging agent, an antistatic agent, a polarity-providing agent, a thixotropic-providing agent, a defoamer and so forth may optionally be added to improve the function.

The conventional reversible thermochromic composition previously described may further be mixed in an appropriate proportion, or a general-purpose dye or pigment (non-metachromatic) may be mixed.

The reversible thermochromic composition described above or the microcapsular pigment material prepared by encapsulating the composition may be dispersed in a medium containing a binder as a film-forming material, so as to be used as reversible thermochromic materials in the form of inks, coating materials and so forth, and may be used to form reversible thermochromic layers on supports such as papers, synthetic papers, cloths, filled or raised fabrics, nonwoven fabrics, synthetic leathers, leathers, plastics, glasses, ceramics, woods and stones, or may be dispersed in such supports, by known means, e.g. printing such as screen printing, offset printing, gravure printing, coater printing, tampon printing or transfer printing, or painting such as brush painting, spray painting, electrostatic painting, electrodeposition, curtain coating, roller painting or dip coating.

When used in the form of the microcapsular pigment material, it may also be kneaded in thermoplastics in a molten state so as to be used as a material integrally made up.

The reversible thermochromic composition of the present invention may be used as, e.g., a colorant for coating materials, printing inks, writing inks, paints and so forth, or as a colorant contained in molded products obtained by molding thermoplastic resins or thermosetting resins.

EXAMPLES

The present invention will be described below in greater detail by giving Examples. The present invention is by no means limited to these.

Examples 1 to 28

Of the present invention, reversible thermochromic compositions having the reversible metachromatic function that they present a color-developed state when heated in a color-extinguished state and presents the color-extinguished state when temperature-dropped or cooled in the color-developed state were prepared as Examples 1 to 20, and microcapsular pigment materials of such reversible thermochromic compositions were also prepared as Examples 21 to 28. Specific components (a), (b) and (c) used and their compositional proportions were as shown in Tables 1 and 2.

Examples 29 to 57

Reversible thermochromic compositions having the reversible metachromatic function that they begin to develop a color in the course of temperature drop after heating, having been triggered by its temperature rise when heated in a color-extinguished state, and returns to the color-extinguished state after it has presented a color-developed state in a maximum developed-color density were prepared as Examples 29 to 57. Specific components (a), (b) and (c) used and their compositional proportions were as shown in Tables 3 and 4.

The microcapsular pigment materials of Examples 21 to 28 were obtained by heating and dissolving the components (a) to (c) at 120° C. to form mutual solutions, and thereafter encapsulated in epoxy resin films by interfacial polymerization of epoxy resin/amine harder.

In Tables 1 to 4, numerical values in parentheses are indicated as part(s) by weight.

Samples for measurement:

With regard to the reversible thermochromic compositions of Examples 1 to 20, samples for measurement of characteristics were each prepared by dissolving the components (a) to (c) in methyl ethyl ketone in a concentration of 30% by weight in total to form a solution, and impregnating a filter paper (Filter Paper No. 2, available from Toyo Roshi K.K.) with the solution, followed by evaporation of the methyl ethyl ketone. Composition samples thus obtained were heated and brought into a color-developed state, which were thereafter allowed to stand at room temperature.

With regard to the Examples 21–28 microcapsular pigment materials of the reversible thermochromic compositions, samples for measurement of characteristics were each prepared by dispersing 40 parts by weight of the microcapsular pigment material in an ethylene-vinyl acetate emulsion to prepare a reversible thermochromic ink. This ink was printed on wood free paper by screen printing to obtain printed samples.

With regard to the reversible thermochromic compositions of Examples 29 to 57, samples for measurement of characteristics were each prepared by dispersing in an ethylene-vinyl acetate emulsion 40 parts by weight of a microcapsular pigment material obtained by encapsulating the composition, to prepare a reversible thermochromic ink. Each ink was printed on wood free paper by screen printing to obtain printed samples.

The measuring samples thus prepared were each set at a prescribed part of a differential calorimeter (a TC-3600 type differential calorimeter, manufactured by Tokyo Denshoku), and were heated and cooled within a temperature width of 60° C. at a rate of 10° C./min. Values of brightness thus indicated on the differential calorimeter at each temperature were plotted on graphs.

Metachromatism and metachromatic temperature of the samples are shown in Tables 5 to 7.

In respect of Examples 47 to 57, brightness at the time of temperature drop to completely color-developed temperature (T2) and brightness at the time of temperature drop to completely color-extinguished temperature (T4) are shown in Table 8.

Meting point and cloud point of the specific component-(b) alkoxyphenol compounds used in the present invention are shown in Table 9.

TABLE 1

| Example: | Component (a) | Component (b) | Component (c) |
| --- | --- | --- | --- |
| 1 | 1,3-dimethyl-6-diethylaminofluoran (0.4) | p-n-hexyloxyphenol (10) | n-octadecane (10) |
| 2 | 3-[2-ethoxy-4-(N-ethylanilino)phenyl]-3-(1-ethyl-2-methylindol-3-yl)-4-azaphthalide (1) | p-n-octyloxyphenol (10) | n-octadecane (10) |
| 3 | 3-[2-ethoxy-4-(N-ethylanilino)phenyl]-3-(1-ethyl-2-methylindol-3-yl)-4-azaphthalide (1) | p-n-decyloxyphenol (10) | n-octadecane (10) |
| 4 | 3,3-bis-(p-dimethylaminophenyl)-6-dimethylaminophthalide (1) | p-n-dodecyloxyphenol (10) | n-octadecane (10) |
| 5 | 3-[2-ethoxy-4-(N-ethylanilino)phenyl]-3-(1-ethyl-2-methylindol-3-yl)-4-azaphthalide (1) | p-n-octyloxyphenol (10) | n-octadecane (50) |
| 6 | 3-[2-ethoxy-4-(N-ethylanilino)phenyl]-3-(1-ethyl-2-methylindol-3-yl)-4-azaphthalid (0.6) | p-n-octyloxyphenol (10) | n-eicosene (10) |
| 7 | 3-[2-ethoxy-4-(N-ethylanilino)phenyl]-3-(1-ethyl-2-methylindol-3-yl)-4-azaphthalide (1) | p-n-octyloxyphenol (10) | n-octadecane (45) n-hexadecyl alcohol (5) |
| 8 | 3-[2-ethoxy-4-(N-ethylanilino)phenyl]-3-(1-ethyl-2-methylindol-3-yl)-4-azaphthalide (1) | p-n-octyloxyphenol (7) p-n-heptyloxyphenol (3) | n-octadecane (50) |
| 9 | 1,3-dimethyl-6-diethylaminofluoran (0.4) | p-n-octyloxyphenol (10) | diphenyl (10) |
| 10 | 3-[2-ethoxy-4-(N-ethylanilino)phenyl]-3-(1-ethyl-2-methylindol-3-yl)- | p-n-octyloxyphenol (10) | 1-bromodocosane (10) |

TABLE 1-continued

| Example: | Component (a) | Component (b) | Component (c) |
|---|---|---|---|
| | 4-azaphthalide (1) | | |
| 11 | 3-[2-ethoxy-4-(N-ethylanilino)phenyl]-3-(1-ethyl-2-methylindol-3-yl)-4-azaphthalide (1) | p-n-octyloxyphenol (10) | n-dodecyl ether (10) |
| 12 | 3,3-bis(1-n-butyl-2-methylindol-3-yl)-phthalide (0.3) | p-n-octyloxyphenol (10) | benzyl phenyl ether (2) |
| 13 | 3-[2-ethoxy-4-(N-ethylanilino)phenyl]-3-(1-ethyl-2-methylindol-3-yl)-4-azaphthalide (1) | p-n-octyloxyphenol (10) | n-dodecyl sulfide (10) |
| 14 | 3-[2-ethoxy-4-(N-ethylanilino)phenyl]-3-(1-ethyl-2-methylindol-3-yl)-4-azaphthalide (1) | p-n-octyloxyphenol (10) | 6-undecanone (50) |
| 15 | 3-[2-ethoxy-4-(N-ethylanilino)phenyl]-3-(1-ethyl-2-methylindol-3-yl)-4-azaphthalide (1) | p-n-octyloxyphenol (10) | benzophenone (10) |
| 16 | 1,2-benz-6-(N-ethyl-N-isobutylamino)-fluoran (0.3) | p-n-octyloxyphenol (10) | stearyl caprate (10) |
| 17 | 3,3-bis(p-dimethylaminophenyl)-6-dimethylaminophthalide (1) | p-n-octyloxyphenol (10) | benzyl palmitate (5) |
| 18 | 2-(2-chloroanilino)-6-di-n-butylaminofluoran (1) | p-n-octyloxyphenol (10) | pentanediol dimyristate (5) |
| 19 | 1,3-dimethyl-6-diethylaminofluoran (0.4) | p-n-octyloxyphenol (20) | n-hexadecyl alcohol (1) |
| 20 | 3-[2-ethoxy-4-(N-ethylanilino)phenyl]-3-(1-ethyl-2-methylindol-3-yl)-4-azaphthalide (1) | p-n-octyloxyphenol (10) | oleic acid amide (5) |

TABLE 2

| Example: | Component (a) | Component (b) | Component (c) |
|---|---|---|---|
| 21 | 3-[2-ethoxy-4-(N-ethylanilino)phenyl]-3-(1-ethyl-2-methylindol-3-yl)-4-azaphthalide (1.0) | p-n-octyloxyphenol (10.0) | n-docosane (20.0) |
| 22 | 3-[2-ethoxy-4-(N-ethylanilino)phenyl]-3-(1-ethyl-2-methylindol-3-yl)-4-azaphthalide (1.0) | p-n-nonyloxyphenol (1) p-n-octyloxyphenol (7) p-n-heptyloxyphenol (3) | n-eicosane (20.0) |
| 23 | 1,3-dimethyl-6-diethylaminofluoran (1.0) | p-n-octyloxyphenol (8) p-n-heptyloxyphenol (2) | n-eicosane (20.0) |
| 24 | 2-(2-chloroanilino)-6-di-n-butylaminofluoran (1.5) | p-n-nonyloxyphenol (2) p-n-octyloxyphenol (6) p-n-heptyloxyphenol (4) | n-eicosane (10.0) |
| 25 | 3,3-bis(1-n-butyl-2-methylindol-3-yl)-phthalide (1.5) | p-n-octyloxyphenol (8) p-n-heptyloxyphenol (2) | n-eicosane (10.0) |
| 26 | 3-[2-ethoxy-4-(N-ethylanilino)phenyl]-3-(1-ethyl-2-methylindol-3-yl)-4-azaphthalide (1.0) | p-n-octyloxyphenol (10.0) | n-hexadecane (50.0) |
| 27 | 3-[2-ethoxy-4-(N-ethylanilino)phenyl]-3-(1-ethyl-2-methylindol-3-yl)-4-azaphthalide (1.0) | p-n-octyloxyphenol (10.0) | n-tetracosane (50.0) |
| 28 | 3,3-bis(1-n-butyl-2-methylindol-3-yl)- | p-n-octyloxyphenol | n-eicosane |

TABLE 2-continued

| Example: | Component (a) | Component (b) | Component (c) |
|---|---|---|---|
| | phthalide (1.5) | (10.0) | (49.0) erucic acid amide (1.0) |

TABLE 3

| Example: | Component (a) | Component (b) | Component (c) |
|---|---|---|---|
| 29 | 3-(2-ethoxy-4-N-ethylanilino)-3-(1-ethyl-2-methylindol-3-yl)-4-azaphthalide (2.0) | p-n-heptyloxyphenol (8.0) | cetyl alcohol (25.0) stearyl caprate (25.0) |
| 30 | 3-(2-ethoxy-4-N-ethylanilino)-3-(1-ethyl-2-methylindol-3-yl)-4-azaphthalide (2.0) | p-n-octyloxyphenol (8.0) | stearyl caprate (50.0) |
| 31 | 3-(2-ethoxy-4-N-ethylanilino)-3-(1-ethyl-2-methylindol-3-yl)-4-azaphthalide (1.0) | p-n-octyloxyphenol (16.0) | stearyl caprate (50.0) |
| 32 | 3-(2-ethoxy-4-N-ethylanilino)-3-(1-ethyl-2-methylindol-3-yl)-4-azaphthalide (2.0) | p-n-decyloxyphenol (8.0) | n-propyl behenate (50.0) |
| 33 | 3-(2-ethoxy-4-N-ethylanilino)-3-(1-ethyl-2-methylindol-3-yl)-4-azaphthalide (2.0) | p-n-dodecyloxyphenol (8.0) | n-butyl behenate (50.0) |
| 34 | 3-(2-ethoxy-4-N-ethylanilino)-3-(1-ethyl-2-methylindol-3-yl)-4-azaphthalide (2.0) | p-n-tetradecyloxy-phenol (8.0) | n-butyl behenate (50.0) |
| 35 | 1,2-benz-6-(N-ethyl-N-isobutylamino)-fluoran (1.5) | p-n-dodecyloxyphenol (10.0) | n-propyl behebate (50.0) |
| 36 | 3,3-bis(2-ethoxy-4-diethylaminophenyl)-4-azaphthalide (1.0) | p-n-decyloxyphenol (10.0) | n-butyl behebate (50.0) |
| 37 | 2-(2-chloroanilino)-6-di-n-butylaminofluoran (4.0) | p-n-octyloxyphenol (12.0) | cetyl alcohol (25.0) stearyl caprate (25.0) |
| 38 | 1,3-dimethyl-6-diethylaminofluoran (1.5) | p-n-octyloxyphenol (8.0) | 2-ethylpentyl behenate (50.0) |
| 39 | 3-(2-ethoxy-4-N-ethylanilino)-3-(1-ethyl-2-methylindol-3-yl)-4-azaphthalide (3.0) | p-n-octyloxyphenol (10.0) | decyl alcohol (50.0) |
| 40 | 3-(2-ethoxy-4-N-ethylanilino)-3-(1-ethyl-2-methylindol-3-yl)-4-azaphthalide (3.0) | p-n-octyloxyphenol (10.0) | lauryl alcohol (50.0) |
| 41 | 1,2-benz-6-(N-ethyl-N-isobutylamino)-fluoran (1.5) | p-n-octyloxyphenol (8.0) | 7-tridecane (50.0) |
| 42 | 1,3-dimethyl-6-diethylaminofluoran (2.0) | p-n-octyloxyphenol (10.0) | tetradecyl ether (50.0) |
| 43 | 3,3-bis(1-n-butyl-2-methylindol-3-yl)-phthalide (2.0) | p-n-decyloxyphenol (10.0) | 1,5-pentadiol dimyristate (50.0) |
| 44 | 3-(2-ethoxy-4-N-ethylanilino)-3-(1-ethyl-2-methylindol-3-yl)-4-azaphthalide (2.0) | p-n-octyloxyphenol (8.0) | stearyl alcohol (50.0) |
| 45 | 3,3-bis(2-ethoxy-4-diethylaminophenyl)-4-azaphthalide (1.0) | p-n-octyloxyphenol (10.0) | oleic acid amide (50.0) |
| 46 | 3-(2-ethoxy-4-N-ethylanilino)-3-(1-ethyl-2-methylindol-3-yl)-4-azaphthalide (2.0) | p-n-octyloxyphenol (8.0) | dilauryl adipate (50.0) |

TABLE 4

| Example: | Component (a) | Component (b) | Component (c) |
|---|---|---|---|
| 47 | 1,2-benz-6-(N-ethyl-N-isobutylamino)-phthalide (1.5) | p-n-octyloxyphenol (8.0) | stearyl laurate (50.0) |
| 48 | 1,2-benz-6-(N-ethyl-N-isobutylamino)-phthalide (1.5) | p-n-decyloxyphenol (8.0) | stearyl laurate (50.0) |
| 49 | 1,2-benz-6-(N-ethyl-N-isobutylamino)-phthalide (1.5) | p-n-decyloxyphenol (8.0) | stearyl laurate (25.0) paraffin wax 115° F. (25.0) |
| 50 | 3,3-bis(1-n-butyl-2-methylindol-3-yl)-phthalide (2.0) | p-n-octyloxyphenol (8.0) | stearyl laurate (50.0) |
| 51 | 3,3-bis(1-n-butyl-2-methylindol-3-yl)-phthalide (2.0) | p-n-nonyloxyphenol (8.0) | stearyl laurate (50.0) |
| 52 | 3,3-bis(1-n-butyl-2-methylindol-3-yl)-phthalide (2.0) | p-n-nonyloxyphenol (8.0) | stearyl laurate (25.0) paraffin wax 115° F. (25.0) |
| 53 | 3,3-bis(1-n-butyl-2-methylindol-3-yl)-phthalide (2.0) | p-n-nonyloxyphenol (8.0) | stearyl laurate (25.0) n-eicosane (25.0) |
| 54 | 3,3-bis(1-n-butyl-2-methylindol-3-yl)-phthalide (2.0) | p-n-nonyloxyphenol (8.0) | stearyl laurate (25.0) n-docosane (25.0) |
| 55 | 3,3-bis(1-n-butyl-2-methylindol-3-yl)-phthalide (2.0) | p-n-nonyloxyphenol (8.0) | stearyl laurate (25.0) n-tetracosane (25.0) |
| 56 | 3,3-bis(1-n-butyl-2-methylindol-3-yl)-phthalide (2.0) | p-n-nonyloxyphenol (8.0) | stearyl laurate (10.0) 1-docosene (40.0) |
| 57 | 3,3-bis(1-n-butyl-2-methylindol-3-yl)-phthalide (2.0) | p-n-nonyloxyphenol (8.0) | stearyl laurate (10.0) 1-eicosane (40.0) |

TABLE 5

| | | Metachromatic temp. | | | | |
|---|---|---|---|---|---|---|
| Example: | Metachromatism (cooled ←→ heated) | T1 (° C.) | T2 (° C.) | T3 (° C.) | T4 (° C.) | ΔH (° C.) |
| 1 | colorless ←→ orange | 9 | 40 | 29 | 0 | 10.0 |
| 2 | colorless ←→ blue | 33 | 56 | 45 | 34 | 5.0 |
| 3 | colorless ←→ blue | 46 | 66 | 59 | 48 | 2.5 |
| 4 | colorless ←→ blue | 63 | 77 | 74 | 54 | 6.0 |
| 5 | colorless ←→ blue | 29 | 53 | 32 | 26 | 12.0 |
| 6 | colorless ←→ blue | 33 | 56 | 45 | 37 | 3.5 |
| 7 | colorless ←→ blue | 30 | 54 | 34 | 28 | 11.0 |
| 8 | colorless ←→ blue | 26 | 42 | 27 | 16 | 12.5 |
| 9 | colorless ←→ orange | 21 | 49 | 47 | 19 | 2.0 |
| 10 | colorless ←→ blue | 34 | 55 | 44 | 33 | 6.0 |
| 11 | colorless ←→ blue | 26 | 53 | 29 | 22 | 14.0 |
| 12 | colorless ←→ pink | 17 | 60 | 54 | 18 | 2.5 |
| 13 | colorless ←→ blue | 28 | 53 | 28 | 21 | 16.0 |
| 14 | colorless ←→ blue | 31 | 58 | 29 | 22 | 19.0 |
| 15 | colorless ←→ blue | 16 | 46 | 23 | 16 | 11.5 |
| 16 | colorless ←→ pink | 38 | 55 | 37 | 31 | 12.5 |
| 17 | colorless ←→ blue | 25 | 55 | 42 | 33 | 2.5 |
| 18 | colorless ←→ black | 40 | 58 | 43 | 35 | 10.0 |
| 19 | colorless ←→ orange | 28 | 62 | 57 | 30 | 1.5 |
| 20 | colorless ←→ blue | 22 | 45 | 23 | 17 | 13.5 |

TABLE 6

| | | Metachromatic temp. | | | | |
|---|---|---|---|---|---|---|
| Example: | Metachromatism (cooled ←→ heated) | T1 (° C.) | T2 (° C.) | T3 (° C.) | T4 (° C.) | ΔH (° C.) |
| 21 | colorless ←→ blue | 41 | 55 | 36 | 32 | 14.0 |
| 22 | colorless ←→ blue | 25 | 43 | 29 | 17 | 11.0 |
| 23 | colorless ←→ orange | 21 | 47 | 28 | 10 | 15.0 |
| 24 | colorless ←→ black | 20 | 38 | 28 | 8 | 11.0 |
| 25 | colorless ←→ pink | 21 | 46 | 27 | 9 | 15.5 |
| 26 | colorless ←→ blue | 30 | 48 | 11 | 0 | 33.5 |
| 27 | colorless ←→ blue | 42 | 56 | 41 | 25 | 16.0 |
| 28 | colorless ←→ pink | 24 | 40 | 29 | 15 | 10.0 |

TABLE 7

| | | Metachromatic temp. | | | |
|---|---|---|---|---|---|
| Example: | Metachromatism | T5 (° C.) | T1 (° C.) | T2 (° C.) | T4 (° C.) |
| 29 | blue ←→ colorless | 38 | 26 | 21 | 15 |
| 30 | blue ←→ colorless | 36 | 30 | 24 | 20 |
| 31 | blue ←→ colorless | 36 | 29 | 24 | 22 |
| 32 | blue ←→ colorless | 47 | 38 | 33 | 30 |
| 33 | blue ←→ colorless | 40 | 33 | 29 | 26 |
| 34 | blue ←→ colorless | 40 | 35 | 32 | 29 |
| 35 | pink ←→ colorless | 40 | 37 | 33 | 29 |

TABLE 7-continued

| | | Metachromatic temp. | | | |
|---|---|---|---|---|---|
| Example: | Metachromatism | T5 (° C.) | T1 (° C.) | T2 (° C.) | T4 (° C.) |
| 36 | darkgreen ←→ colorless | 44 | 36 | 24 | 14 |
| 37 | blue ←→ colorless | 35 | 27 | 24 | 21 |
| 38 | orange ←→ colorless | 36 | 30 | 15 | 2 |
| 39 | blue ←→ colorless | 0 | −9 | −14 | −20 |
| 40 | blue ←→ colorless | 15 | 10 | 2 | −7 |
| 41 | pink ←→ colorless | 25 | 17 | 12 | 8 |
| 42 | orange ←→ colorless | 45 | 38 | 35 | 33 |
| 43 | purplish red ←→ colorless | 35 | 30 | 25 | 20 |
| 44 | blue ←→ colorless | 55 | 47 | 38 | 30 |
| 45 | dark green ←→ colorless | 40 | 32 | 23 | 14 |
| 46 | blue ←→ colorless | 40 | 31 | 27 | 24 |
| 47 | pink ←→ colorless | 46 | 37 | 34 | 8 |
| 48 | pink ←→ colorless | 44 | 38 | 35 | 20 |
| 49 | pink ←→ colorless | 40 | 36 | 27 | 16 |
| 50 | pink ←→ colorless | 45 | 37 | 34 | 10 |
| 51 | pink ←→ colorless | 45 | 38 | 35 | 24 |
| 52 | pink ←→ colorless | 42 | 37 | 25 | 15 |
| 53 | pink ←→ colorless | 36 | 28 | 25 | 21 |
| 54 | pink ←→ colorless | 38 | 34 | 29.5 | 17 |
| 55 | pink ←→ colorless | 44 | 40 | 28 | 19 |
| 56 | pink ←→ colorless | 34 | 30 | 25 | 18 |
| 27 | pink ←→ colorless | 24 | 22 | 13 | 4 |

TABLE 8

| | Brightness | |
|---|---|---|
| Example: | T2 | T4 |
| 47 | 6.5 | 8.2 |
| 48 | 8.1 | 8.6 |
| 49 | 6.0 | 8.5 |
| 50 | 6.8 | 8.6 |
| 51 | 8.5 | 8.9 |
| 52 | 6.3 | 8.7 |
| 53 | 6.8 | 8.8 |
| 54 | 6.2 | 8.8 |
| 55 | 6.5 | 8.8 |
| 56 | 6.4 | 8.8 |
| 57 | 7.4 | 9.0 |

TABLE 9

| Alkoxyphenol compound | Melting point (° C.) | Cloud point (° C.) |
|---|---|---|
| p-n-propyloxyphenol | 56.8 | 44.3 |
| p-n-butyloxyphenol | 66.4 | 56.6 |
| p-n-pentyloxyphenol | 48.3 | 33.8 |
| p-n-hexyloxyphenol | 47.0 | 37.9 |
| p-n-heptyloxyphenol | 62.4 | 52.8 |
| p-n-octyloxyphenol | 62.3 | 55.1 |
| p-n-nonyloxyphenol | 71.8 | 62.0 |
| p-n-decyloxyphenol | 72.5 | 66.5 |
| p-n-dodecyloxyphenol | 77.5 | 72.0 |
| p-n-tetradecyloxyphenol | 78.6 | 73.6 |
| p-n-octyldecyloxyphenol | 87.8 | 84.5 |

As described above, in the system where the composition exhibits the metachromatic behavior that it presents a color-developed state when heated in a color-extinguished state and returns to the color-extinguished state when temperature-dropped or cooled in the color-developed state, the reversible thermochromic composition of the present invention shows a metachromatic behavior which is contrary to that of conventional reversible thermochromic compositions which cause metachromatism and are color-extinguished upon heating within the life-environment temperature range, and can be used in the various fields of temperature indicators, temperature detectors, forgery prevention, schooling elements, toys, decoration and so forth, satisfying practical utility as a new thermochromic material.

In the system where the composition exhibits the metachromatic behavior that it begins to develop a color in the course of temperature drop after heating, having been triggered by its temperature rise when heated in a color-extinguished state, and returns to the color-extinguished state after it has presented a color-developed state in a maximum developed-color density, the reversible thermochromic composition can have a metachromatic performance not available in conventional reversible thermochromic compositions, and can be used in the same various fields as the above, satisfying a peculiarity.

Especially when used in toys, the color-developed/color-extinguished reversible metachromatic effect can be exhibited with ease at a life-environment temperature range of hot water, cold water or the body heat or by a thermal means having a slightly higher temperature than the life-environment temperature range. Hence, it can satisfy the sense of surprise and the delicacy of metachromatism, and can contribute to the improvement of commercial value.

Moreover, when used in combination with a conventional reversible thermochromic composition of the type of being color-extinguished upon heating, the reversible thermochromic composition can be made metachromatic in a great variety.

What is claimed is:

1. A reversible thermochromic composition which develops color when heated and extinguishes color upon temperature decrease comprising;

(a) an electron-donating color-developing organic compound;

(b) at least one electron-accepting alkoxyphenol compound represented by Formula I:

(I)

wherein R represents a straight-chain or branched alkyl group having 3 to 18 carbon atoms; and (c) a compound serving as a reaction medium which reversibly causes electron-donating/accepting reaction between the components (a) and (b).

2. The reversible thermochromic composition according to claim 1, wherein R is a straight-chain alkyl group having 8 to 12 carbon atoms.

3. The reversible thermochromic composition according to claim 1, wherein said component (c) contains at least one compound selected from a chain hydrocarbon, an alicyclic hydrocarbon, an aromatic hydrocarbon and a halogenated hydrocarbon.

4. The reversible thermochromic composition according to claim 1, which is encapsulated in the form of microcapsules.

5. The reversible thermochromic composition according to claim 1, which has a reversible metachromatic function that the composition presents a color-developed state when heated in a color-extinguished state and presents the color-extinguished state when temperature-dropped or cooled in the color-developed state.

6. The reversible thermochromic composition according to claim 5, wherein said reversible thermochromic composition is heated at a temperature not higher than 90° C.

7. The reversible thermochromic composition according to claim 1, which has a reversible metachromatic function that the composition begins to develop a color in the course of temperature drop after heating, having been triggered by its temperature rise when heated in a color-extinguished state, and returns to the color-extinguished state after it has presented a color-developed state in a maximum developed-color density.

8. The reversible thermochromic composition according to claim 7, wherein said reversible thermochromic composition is heated at a temperature not lower than the melting point of the component-(c) compound.

* * * * *

UNITED STATES PATENT AND TRADEMARK OFFICE
CERTIFICATE OF CORRECTION

PATENT NO. : 5,919,404
DATED : July 6, 1999
INVENTOR(S) : KATSUYUKI FUJITA ET AL.

It is certified that error appears in the above-identified patent and that said Letters Patent is hereby corrected as shown below:

COLUMN 1

Line 47, "exhibits" should read --exhibiting--.

COLUMN 2

Line 19, "components;" should read --components:--.

COLUMN 4

Line 3, "buthylamino)" should read --butylamino-- (both occurrences);
Line 5, "buthylamino)" should read --butylamino)--;
Line 8, "buthylamino)" should read --butylamino)--;
Line 10, "buthylamino)" should read --butylamino)--;
Line 11, "buthylamino)" should read --butylamino)--.

COLUMN 5

Line 39, "1-nonacosane" should read --1-nonacosene--.

COLUMN 6

Line 6, "octydodecyl" should read --octadodecyl--;
Line 23, "ketons" should read --ketones--;
Line 30, "2-pentadecanone," should be deleted;
Line 52, "alicylic" should read --alicyclic--.

COLUMN 7

Line 13, "dillaurate," should read --dilaurate,--.

UNITED STATES PATENT AND TRADEMARK OFFICE
CERTIFICATE OF CORRECTION

PATENT NO. : 5,919,404
DATED : July 6, 1999
INVENTOR(S) : KATSUYUKI FUJITA ET AL.

Page 2 of 3

It is certified that error appears in the above-identified patent and that said Letters Patent is hereby corrected as shown below:

COLUMN 8

Line 26, "alcohol penta-" should read --alcohol, penta---;
Line 28, "alcohol eicosyl" should read --alcohol, eicosyl--.

COLUMN 9

Line 13, "repeseed" should read --rapeseed--.

COLUMN 12

Line 65, "presents" should read --present--.

COLUMN 13

Line 21, "harder." should read --hardener.--.

COLUMN 14

Line 1, "microcapsular" should read --of microcapsular--;
Line 6, "wood free" should read --wood-free--;
Line 14, "wood free" should read --wood-free--;
Table 1, "4-azaphthalid" should read --4-azaphthalide--.

COLUMN 17

Table 3, "behebate" should read --behenate-- (both occurrences).

UNITED STATES PATENT AND TRADEMARK OFFICE
CERTIFICATE OF CORRECTION

PATENT NO. : 5,919,404
DATED : July 6, 1999
INVENTOR(S) : KATSUYUKI FUJITA ET AL.

It is certified that error appears in the above-identified patent and that said Letters Patent is hereby corrected as shown below:

COLUMN 21

Table 7. cont'd., under "Example:", " 27" should read --57--;
Line 33, "comprising;" should read --comprising:--.

Signed and Sealed this

Eleventh Day of April, 2000

Attest:

Attesting Officer

Q. TODD DICKINSON

Director of Patents and Trademarks